Nov. 28, 1967    J. SANGLAS CAMPS    3,354,976
MOTORCYCLES
Filed Jan. 28, 1966

INVENTOR.
Javier Sanglas Camps
BY
Michael S. Striker

United States Patent Office 3,354,976
Patented Nov. 28, 1967

3,354,976
MOTORCYCLES
Javier Sanglas Camps, Calle Fernando Agulló 12,
Barcelona, Spain
Filed Jan. 28, 1966, Ser. No. 523,782
Claims priority, application Spain, Jan. 29, 1965,
309,092/65
3 Claims. (Cl. 180—32)

ABSTRACT OF THE DISCLOSURE

A motorcycle having a foldable frame comprising a central longitudinally extending rail. An engine unit is secured to the rear end of this frame by means of a suspension device. The unit itself is connected with the driving wheel of the motorcycle. Furthermore, a steering fork is mounted at the front end of the rail and this steering fork is foldable below the rail.

---

This invention relates to a motorcycle having a foldable frame which enables the motorcycle to be folded to the extent where, in the folded position, it occupies a sufficiently small space to be stored, for example in the boot of a car.

Accordingly, the present invention consists in a motorcycle (as hereinbefore defined) having a foldable frame, characterised in that the frame comprises a central longitudinally extending rail at the rear end of which is articulated, by means of a suspension device, a cantilever engine unit provided with the driving wheel of the motor cycle, while at the front end of said rail, there is mounted a steering fork foldable below said rail, and adjacent said front end of the rail a support member is pivotally mounted which extends rearwardly and carries the rider's seat, and which is connected to said rail by means of a further support member adjustable relative to said seat and serving to maintain the seat in its raised position when the motorcycle is in use, and in its lowered position when the frame is folded.

Preferably, the handlebars of the steering fork are so articulated to said fork that the arms are capable of being folded rearwardly to either side of the fuel tank which is mounted on the central rail.

Advantageously, said further support member is articulated at one end on the central rail, and its other end is guided in a longitudinally slotted guide formed in a member depending from the underside of said seat and provided with transverse recesses or notches at the ends thereof which receive said other end of said further support member in order to establish the position of use of the seat.

In order that the invention may be more readily understood, reference is made to the accompanying drawings which illustrate diagrammatically and by way of example, one embodiment thereof, and in which.

Figure 1:
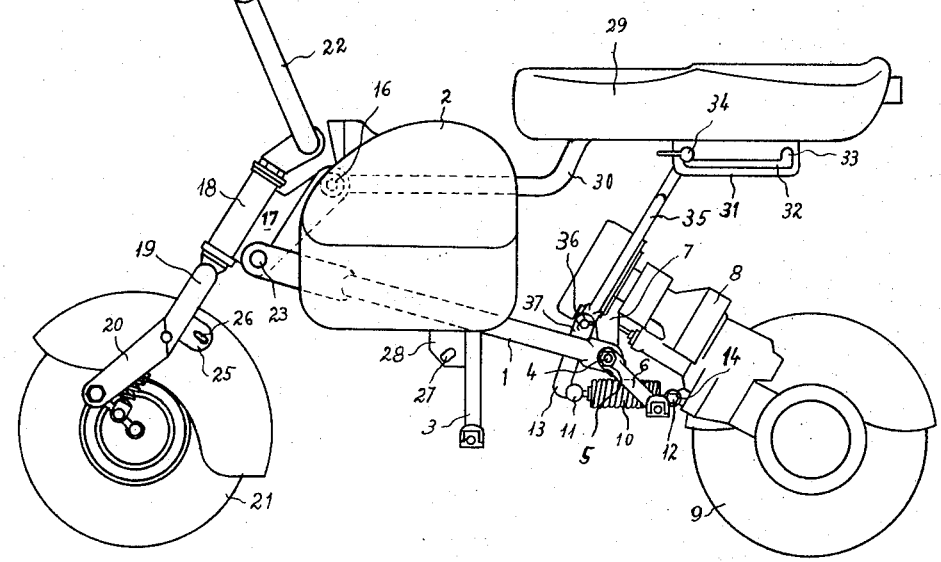
FIG. 1 is a side elevation of a motor cycle in the position of use.

Referring more particularly to the drawings, the frame of the motorcycle comprises a central longitudinally extending rail 1 which may consist of two laterally spaced and braced bars of appropriate shape, on which are mounted by conventional means the accessories such as the fuel tank 2 and foldable foot rests 3.

At the lower, rear end of the rail 1 there is mounted a spindle 4 to which are secured, by means of nuts 5, additional foldable foot rests 6 and on which is articulated in freely-pivoting manner a lug 7 forming part of a monoblock engine unit 8, which forms a rigid cantilever arm carrying at its free end the rear driving wheel 9. The suspension is effected by means of at least one traction spring 10 anchored between spindles 11 and 12 respectively integral with a support 13 which depends from the rail 1, and a lug 14 on the engine unit 8.

At the forward end of the rail 1 are two laterally spaced plates 15 which project upwardly and support a spindle 16 on which is pivotally mounted a support 17, integral with which is a sleeve 18 on which is pivotally mounted the front fork 19. The fork 19 has a conventional suspension device 20 supporting the front wheel 21 and handlebars 22, the arms of which may be selectively positioned by means of a locking arrangement (not shown) easily conceived by a person skilled in the art, between the position of use shown in FIG. 1 and the folded position shown in FIG. 2, in which the arms are folded back and lie on either side of the fuel tank 2.

Figure 2:
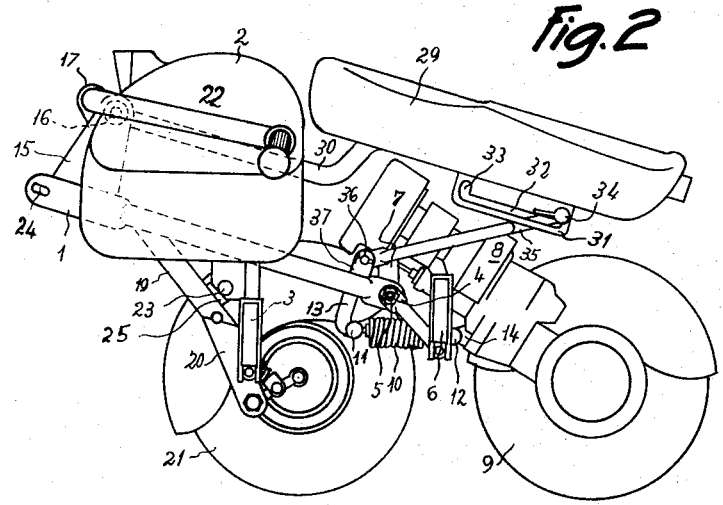
FIG. 2 is a similar view of the motorcycle in the folded position.

The position of the fork 19 as shown in FIG. 1 is maintained by a bolt 23 which passes through respective pairs of alignable apertures or slots, one of which is indicated by the reference numeral 24, at the ends of the bars which form the rail 1, and the other in a corresponding position in the support 17. To secure the frame assembly in the folded position, the fork 19 has a rear lug 25 provided with a slot 26 adapted to coincide with a corresponding slot 27 formed in a lug 28 which projects below the rail 1. For securing the assembly, it is preferable to employ the same bolt 23 which may be provided with a wing-nut or a similar device for easy operation.

The saddle 29 is secured to the rearward end of a cranked member 30 which pivots freely on the spindle 16, and from which underside depends a support member 31 provided with a guide slot 32 arranged longitudinally, at the ends of which are arranged upwardly directed notches 33. The top end of a fork 35 which is articulated by means of braces on a spindle 36 mounted on a support 37 projecting above the rearward end of the rail 1 engages slidably in the guide slot 32, and is displaceable manually by means of a bolt 31, by which the fork 35 can also be secured in the desired position.

From the examination of the two figures illustrated, the manner in which the folding frame described operates will be readily understood. The notches 33, as can be seen, serve to establish the two positions of the saddle.

I claim:

1. A motorcycle having a foldable frame, characterised in that the frame comprises a central, longitudinally extending rail at the rear end of which is articulated, by means of a suspension device, a cantilever engine unit, said unit being provided with the driving wheel of the motorcycle, a steering fork mounted at the front end of said rail and being foldable below said rail, a support member pivotally mounted at the front end of said rail and extending rearwardly and carrying the rider's seat and which is connected to said rail by means of a further support member adjustable relative to said seat and serving to maintain the seat in its raised position when the motorcycle is in use, and in its lowered position when the frame is folded.

2. A motorcycle as claimed in claim 1, wherein the handlebars of the motorcycle are articulated on the steering fork in such a manner that they are capable of being folded rearwardly so that the bars lie on either side of a fuel tank mounted on the central rail.

3. A motorcycle as claimed in claim 1, wherein said further support member is articulated at one end on the central rail, and its other end is guided in a longitudinally slotted guide formed in a member depending from the underside of said seat and provided with transverse recesses or notches at the ends thereof which receive said other end of said further support member in order to establish the position of use of the seat.

References Cited

UNITED STATES PATENTS

| | | | |
|---|---|---|---|
| 3,042,132 | 7/1962 | Bouffort | 280—278 X |
| 3,301,575 | 1/1967 | Ryan et al. | 180—32 X |

FOREIGN PATENTS

| | | |
|---|---|---|
| 800,488 | 8/1958 | Great Britain. |
| 1,011,990 | 4/1952 | France. |

KENNETH H. BETTS, *Primary Examiner.*